(12) United States Patent
Yao

(10) Patent No.: US 11,812,331 B2
(45) Date of Patent: Nov. 7, 2023

(54) METHOD AND APPARATUS FOR MAP QUERY AND ELECTRONIC DEVICE

(71) Applicant: APOLLO INTELLIGENT CONNECTIVITY (BEIJING) TECHNOLOGY CO., LTD., Beijing (CN)

(72) Inventor: Qianpeng Yao, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/804,180

(22) Filed: May 26, 2022

(65) Prior Publication Data

US 2022/0312149 A1 Sep. 29, 2022

(30) Foreign Application Priority Data

Jun. 1, 2021 (CN) .......................... 202110610787.3

(51) Int. Cl.
*H04W 4/021* (2018.01)
*G06F 16/29* (2019.01)
*H04L 67/52* (2022.01)
*G06F 3/04817* (2022.01)

(52) U.S. Cl.
CPC ........ *H04W 4/022* (2013.01); *G06F 3/04817* (2013.01); *G06F 16/29* (2019.01); *H04L 67/52* (2022.05)

(58) Field of Classification Search
CPC .... H04W 4/022; G06F 16/29; G06F 3/04817; H04L 67/52
See application file for complete search history.

(56) References Cited

U.S. PATENT DOCUMENTS

| | | |
|---|---|---|
| 2006/0253226 A1 | 11/2006 | Mendelson |
| 2009/0171576 A1 | 7/2009 | Kim et al. |
| 2019/0034820 A1* | 1/2019 | Manning ................ G06N 5/022 |

FOREIGN PATENT DOCUMENTS

| | | |
|---|---|---|
| CN | 106052706 A | 10/2016 |
| CN | 108235250 A | 6/2018 |
| CN | 111797184 A | 10/2020 |
| JP | 2010236919 A | 10/2010 |
| JP | 2011059069 A | 3/2011 |
| JP | 2013061210 A | 4/2013 |

(Continued)

OTHER PUBLICATIONS

Extended European Search Report issued for European Application No. 22176516.7, dated Oct. 21, 2022 (6 pages).

(Continued)

*Primary Examiner* — Gerald Johnson
(74) *Attorney, Agent, or Firm* — Osha Bergman Watanabe & Burton LLP

(57) ABSTRACT

A method for map query includes the following. A map query request and a current location of a terminal device are obtained. A map area to be displayed and a query object to be highlighted in the map area are obtained based on the map query request and the current location. A display icon corresponding to the query object is generated. A radar chart of the map area is drawn based on the current location, and the location where the query object is located is marked with the display icon.

15 Claims, 19 Drawing Sheets

(56) References Cited

FOREIGN PATENT DOCUMENTS

JP        2013200799 A     10/2013
KR     20170014406 A      2/2017

OTHER PUBLICATIONS

"Get Started Google Developers," https://web.archive.org/web/20210529175801/https://developers.google.com/maps/documentation/urls/get-started; May 29, 2021; pp. 1-24 (24 pages).

Office Action issued in Chinese Application No. 202110610787.3, dated Jun. 21, 2023 (32 pages).

Notification of Reasons for Refusal issued in Japanese Application No. 2022-056948 dated May 23, 2023 (6 pages).

* cited by examiner

METHOD AND APPARATUS FOR MAP QUERY AND ELECTRONIC DEVICE

CROSS REFERENCE TO RELATED APPLICATIONS

This application claims priority and benefits to Chinese Application No. 202110610787.3, filed on Jun. 1, 2021, the entire content of which is incorporated herein by reference.

TECHNICAL FIELD

The disclosure generally relates to a field of data processing technologies, and more specifically to fields of artificial intelligence, autonomous driving, intelligent traffic, big data, and intelligent search technologies.

BACKGROUND

With the rapid development of location-based service (LBS) technologies, various services with a basic function of map query are emerging, and the user's requirement on more rapidly and efficiently acquiring location information is increasingly improved.

SUMMARY

According to a first aspect, a method for map query is provided. A server acquires a map query request and a current location of a terminal device. The server acquires a map area to be displayed and a query object to be highlighted in the map area based on the map query request and the current location. The server generates a display icon corresponding to the query object. The server draws a radar chart of the map area based on the current location, and marks the location where the query object is located with the display icon.

According to a second aspect, another method for map query is provided. A mobile terminal sends a map query request to a server. The mobile terminal receives a radar chart sent by the server, and displays the radar chart.

According to a third aspect, an electronic device is provided. The electronic device includes: at least one processor; and a memory communicatively connected to the at least one processor. The memory has instructions executable by the at least one processor stored thereon. The instructions are performed by the at least one processor to cause the at least one processor to perform the method for map query as described in the first aspect of the disclosure or the method for map query as described in the second aspect of the disclosure.

According to a sixth aspect, there is provided a non-transitory computer readable storage medium having computer instructions stored thereon. The computer instructions are configured to cause the computer to perform the method for map query as described in the first aspect or the method for map query as described in the second aspect.

It is to be understood that, the content described in the part is not intended to identify key or important features of embodiments of the disclosure, nor intended to limit the scope of the disclosure. Other features of the disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

Figure 1:
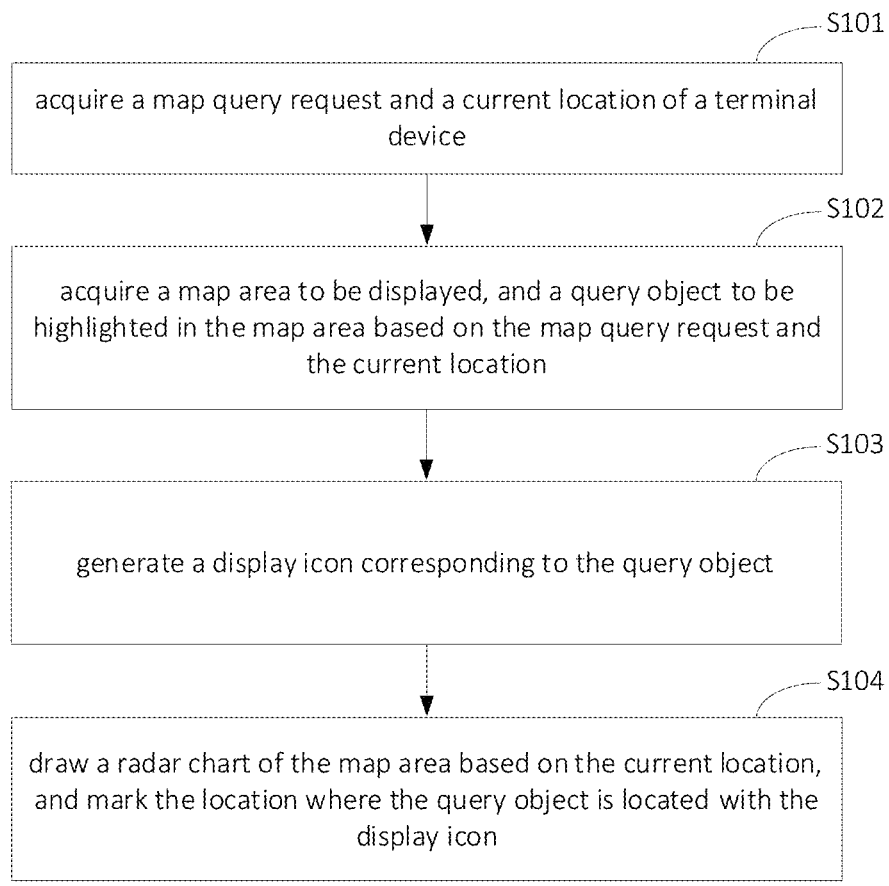
FIG. 1 is a schematic diagram according to an embodiment of the disclosure.

The embodiments of the disclosure are described as below with reference to the accompanying drawings, which include various details of embodiments of the disclosure to facilitate understanding, and should be considered as merely exemplary. Therefore, those skilled in the art should realize that various changes and modifications may be made to the embodiments described herein without departing from the scope and spirit of the disclosure. Similarly, for clarity and conciseness, descriptions of well-known functions and structures are omitted in the following descriptions.

The technical fields related to the disclosure are briefly introduced as below:

Data processing refers to collecting, storing, retrieving, processing, converting, and transmitting data. The data processing is to extract and derive data that is valuable and meaningful for some certain people from a large amount of data that may be disordered and difficult to understand. The data processing is a basic link of system engineering and automatic control. The data processing runs through all areas of social production and social life.

Artificial intelligence (AI) is a subject that studies simulating certain thinking processes and intelligent behaviors (such as learning, reasoning, thinking, planning, etc.) of human beings by a computer, which covers hardware-level technologies and software-level technologies. AI hardware technologies generally include computer vision technology, voice recognition technology, natural language processing (NLP) technology and its learning/deep learning (DL), big data processing technology, knowledge graph technology, etc.

Autonomous driving, generally referred to as autonomous vehicle, also referred to as unmanned vehicle, computer-driven vehicle, or wheeled mobile robot, is an intelligent autonomous vehicle achieved through a computer system. The autonomous vehicle relies on and cooperates with artificial intelligence, visual computing, radar, monitoring devices, and global positioning system, such that the computer may automatically and safely operate a motor vehicle without any active operation of human beings.

Intelligent traffic generally refers to intelligent traffic system (ITS), also referred to as intelligent transportation system, means effectively integrating advanced science and technologies (information technology, computer technology, data communication technology, sensor technology, electronic control technology, automatic control theory, operations planning, artificial intelligence, etc.) in traffic transportation, service control and vehicle manufacturing, and strengthening a link among vehicles, roads and users, thereby forming a comprehensive transportation system that guarantees safety, enhances efficiency, improves environment, and saves energy.

Big data means a set of data that cannot be captured, managed, and processed by a conventional software tool within a certain time range, and means massive, high-growth rate and diversified information assets which require a new processing model to have stronger decision-making power, insight and process optimization capacities.

Intelligent search refers to a technology for retrieving information with an optimal value for users from the network resources that may be acquired based on user's requests. The intelligent search with intelligent and humanized features of information services allows the user to retrieve information by natural language, thereby acquiring a convenient and accurate search service.

In the related art, due to redundant and complicated functions, the method for map query cannot allow the user to achieve the map query conveniently or acquire useful location information intuitively. Therefore, embodiments of the disclosure provide a method and an apparatus for map query to solve the above-identified problem.

The method, the apparatus, and the electronic device will be described below with reference with the drawings.

FIG. 1 is a schematic diagram according to an embodiment of the disclosure. It is to be noted that, an executive subject of the method for map query according to this embodiment is a server. As illustrated in FIG. 1, the method for map query includes the following:

At S101, a map query request and a current location of a terminal device are acquired.

The map query request may include a query range and a query type, etc.

For example, the map query request may include information about searching for a subway station (i.e., the query type) within a 1 kilometer (km) (i.e, the query range).

It is to be noted that, in the disclosure, the map query request may be sent in many ways.

In an example, the map query request may be sent in response to a clicking operation from a user on a query control displayed on a query interface of a terminal device, such as a mobile phone. In another example, the map query request may be sent based on voice information input by the user.

Correspondingly, the server may receive the map query request sent by the terminal device.

Figure 2:
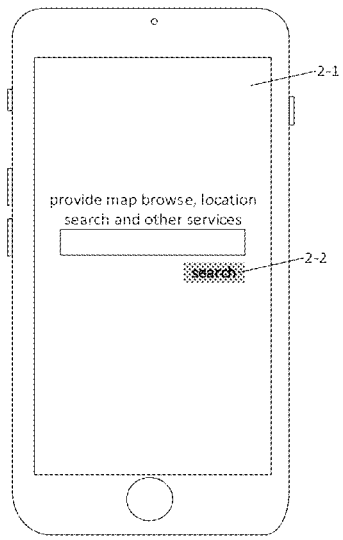
FIG. 2 is a schematic diagram illustrating a query interface.

For example, as illustrated in FIG. 2, an application with a map query function is installed in the terminal device. After the application is launched, the terminal device may send the map query request in response to a clicking operation on a query control 2-2 displayed on a query interface 2-1.

It is to be noted that, in the disclosure, the server may acquire the current location of the terminal device in many ways.

In an example, the current location of the terminal device may be carried in the map query request, such that the server may obtain the current location of the terminal device after receiving the map query request. In another example, the current location of the terminal device is not carried in the map query request. In this case, the server may actively acquire the current location of the terminal device after receiving the map query request.

At S102, a map area to be displayed and a query object to be highlighted in the map area are acquired based on the map query request and the current location.

After the map query request and the current location of the terminal device are acquired, the map area to be displayed may be acquired based on the map query request and the current location.

It is to be noted that, the manner of acquiring the map area to be displayed based on the map query request and the current location is not limited in the disclosure, which may be selected based on actual conditions.

In an example, the map area to be displayed may be acquired based on the obtained map query request and the obtained current location, in combination with a preset default range, such as 3 km.

In another example, the query range preset by the user may be carried in the map query request. The server may obtain the query range, such as 1 km, based on the map query request after receiving the map query request, and further acquire the map area to be displayed based on the query range.

There may be one or more query object to be highlighted in the map area. In this case, one or more query objects to be highlighted in the map area may be obtained.

The term "the query object to be highlighted" refers to that the query object needs to be displayed in a highlighting manner. The query object to be highlighted in the map area may be acquired after the map area to be displayed is acquired.

It is to be noted that, the manner of acquiring the query object to be highlighted in the map area is not limited, which may be selected based on the actual conditions.

In an example, the query object to be highlighted in the map area can be acquired based on a preset strategy. For example, after the map query request is acquired, all objects within the map area may be determined as the query objects to be highlighted in the map area by default. The term "all objects" refers to each object at a relatively fixed location, such as each subway station, each bus station, each public toilet, etc.

In another example, the query type preset by the user may be carried in the map query request, and the server may obtain the query type from the map query request after receiving the map query request, and further obtain the query object to be highlighted in the map area based on the query type. For example, the query type is subway station. In this case, after the map query request is acquired, each subway station within the map area may be determined as a query object to be highlighted in the map area.

At S103, a display icon corresponding to the query object is generated.

When there are two or more query objects to be highlighted in the map area, the generated display icons correspond to the query objects one by one respectively.

For example, for the query objects A to C, corresponding display icons 1 to 3 may be generated in sequence respectively.

At S104, a radar chart of the map area is drawn based on the current location, and a location where the query object is located is marked with the display icon.

Radar chart is a graphical method of displaying multivariate data in a form of a two-dimensional chart representing three or more quantitative variables on axes starting from the same point. The relative location and angle of the axes generally carry no information.

Figure 3:
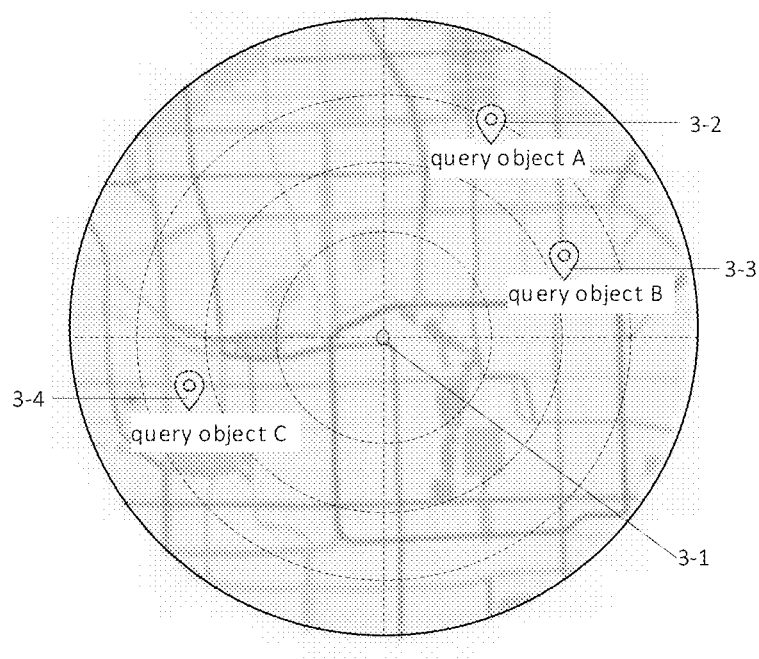
FIG. 3 is a schematic diagram illustrating a radar chart.

When there are two or more query objects to be highlighted in the map area, the location where each query object is located is marked with a corresponding display icon. For example, as illustrated in FIG. 3, the radar chart of the map area is drawn by taking the current location 3-1 as a center, and display icons 3-2 to 3-4 are displayed on the locations where the query objects A to C are located.

With the method for map query according to embodiments of the disclosure, by obtaining the map query request and the current location of the terminal device, the map area to be displayed and the query object(s) are acquired based on the map query request and the current location, and the display icon(s) corresponding to the query object(s) is generated. The radar chart of the map area is drawn based on the current location. The location where each query object is located is marked with a corresponding display icon. Therefore, in the disclosure, by displaying the radar chart with the current location as the center, the user may achieve the map query conveniently, and at the same time, acquire useful location information intuitively, which enhances efficiency in the map query process and improves the user experience.

It is to be noted that, in the disclosure, in drawing the radar chart of the map area based on the current location and marking the location where the query object is located with the display icon, the display icon may be displayed on the radar chart in a suspension manner, i.e., the display icon is displayed in an upper layer of map data.

Figure 4:
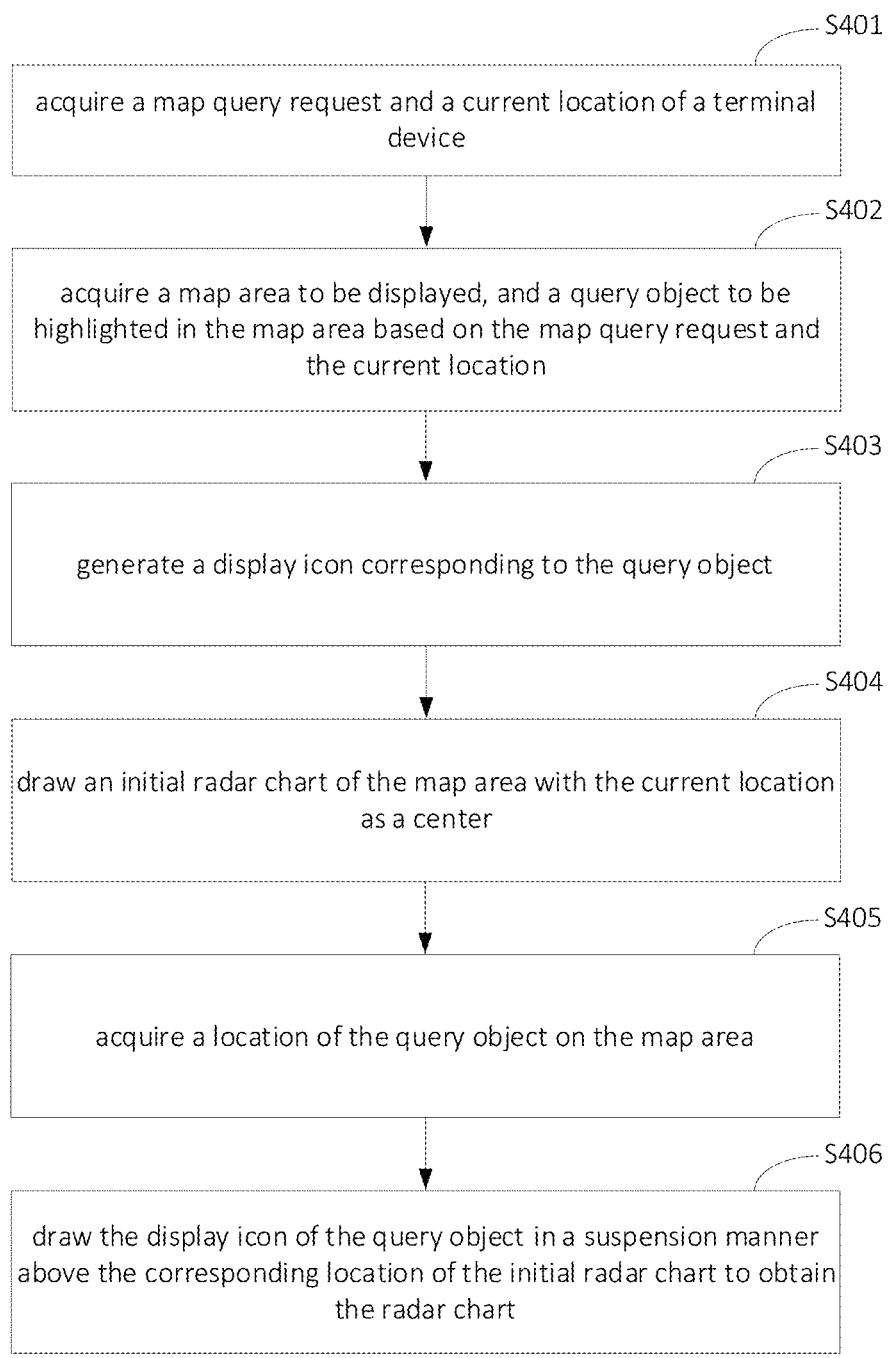
FIG. 4 is a schematic diagram according to an embodiment of the disclosure.

As a possible implementation, as illustrated in FIG. 4, the method for map query based on the above embodiment may include the following.

At S401, the map query request and the current location of the terminal device are acquired.

At S402, the map area to be displayed and the query object to be highlighted in the map area are acquired based on the map query request and the current location.

At S403, the display icon corresponding to the query object is generated.

The blocks S401 to S403 are the same with the above blocks S101 to S103 in the above embodiment, which are not repeated here.

The block S104 in the above embodiment may include the following blocks S404 to S406.

At S404, an initial radar chart of the map area is drawn with the current location as a center.

Figure 5:
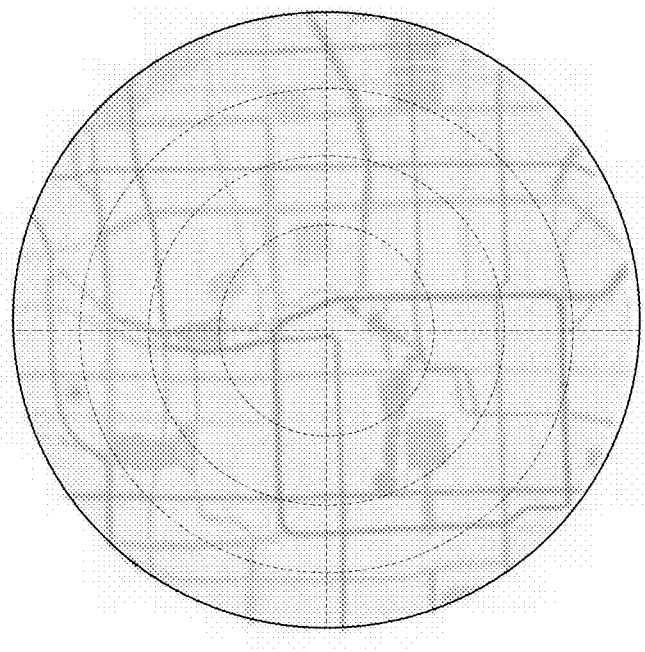
FIG. 5 is a schematic diagram illustrating an initial radar chart.

The initial radar chart may be a chart with basic geography information, as illustrated in FIG. 5.

At S405, a location of the query object on the map area is acquired.

When there are two or more query objects, the location of each query object is acquired. Information of each query object may be set in advance, including a unique identifier such as a name of the query object, the location, and a service type, etc. In an example, the location of the query object may be obtained based on the identifier of the query object, and the location may be determined as the location of the query object on the map area. The location of the query object refers to an absolute location (or ground truth) of the query object. The absolute location can be obtained by a global positioning system (GPS).

For example, the query object is the subway station A. The acquired location of the subway station A on the map area may be east longitude: A1° B1' C1", north latitude: A2° B2' C2".

At S406, the display icon of the query object is drawn in a suspension manner above the location of the initial radar chart to obtain the radar chart.

Figure 6:
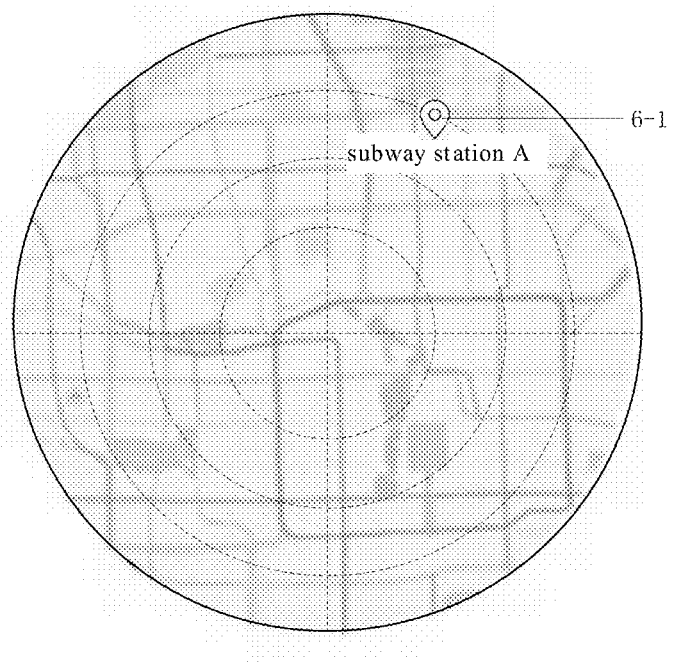
FIG. 6 is a schematic diagram illustrating another radar chart.

The "suspension manner" refers to displaying the display icons in an upper layer of the map data. For example, as illustrated in FIG. 6, the query object is the subway station A, and the display icon is 6-1. In this example, the display icon 6-1 of the subway station A is drawn in a suspension manner such that the display icon 6-1 is above the corresponding location of the initial radar chart (that is, east longitude: A1° B1' C1", north latitude: A2° B2' C2"), to obtain the radar chart. When there are two or more query objects, display icons are drawn in the suspension manner above corresponding locations of the initial radar chart to obtain the radar chart.

With the method for map query according to embodiments of the disclosure, by drawing the initial radar chart of the map area taking the current location as the center, and obtaining the location of the query object on the map area, as well as displaying the display icon of the query object above the corresponding location of the initial radar chart in the suspension manner to obtain the radar chart, the drawn radar chart may display the drawn display icon(s), thereby displaying a relative location relationship between the current location of the terminal device and each query object, which further enhances the visualization effect of a map query result and further improves the user experience.

It is to be noted that, in the disclosure, in order to perform the map query rapidly and accurately, in obtaining the map area to be displayed and the query object to be highlighted in the map area based on the map query request and the current location, the query object may be obtained through screening based on the query range.

It is to be noted that, in the disclosure, the query range may be carried in the map query request, or the query range is not carried in the map query request and the user may input the query range in many ways.

Figure 7:
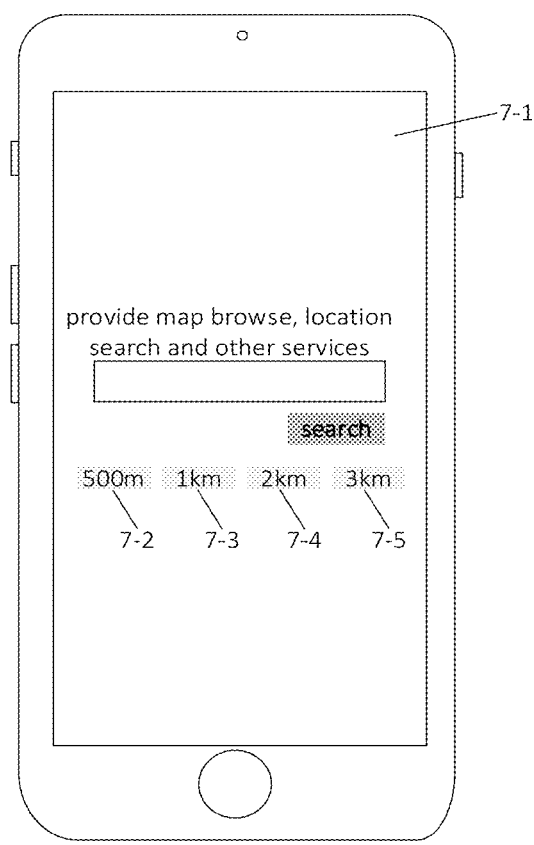
FIG. 7 is a schematic diagram illustrating another query interface.

As a possible implementation, as illustrated in FIG. 7, the query range may be input in response to a clicking operation from the user on query range selecting controls 7-2 to 7-5 displayed on the query interface 7-1. In this case, the query range is carried in the map query request.

Figure 8:
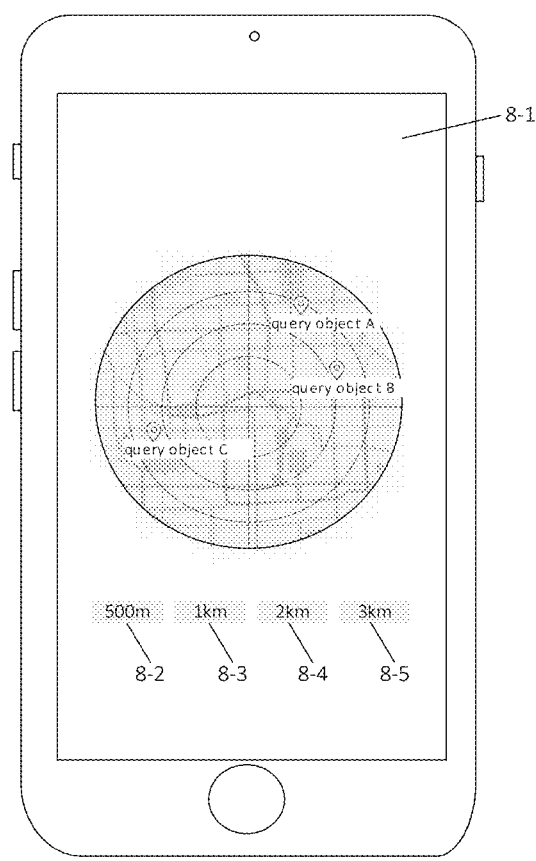
FIG. 8 is a schematic diagram illustrating a search display interface.

As another possible implementation, as illustrated in FIG. 8, the query range may be input in response to a clicking operation from the user on clicking query range selecting controls 8-2 to 8-5 displayed on a search display interface 8-1. In this case, the query range is not carried in the map query request.

Figure 9:
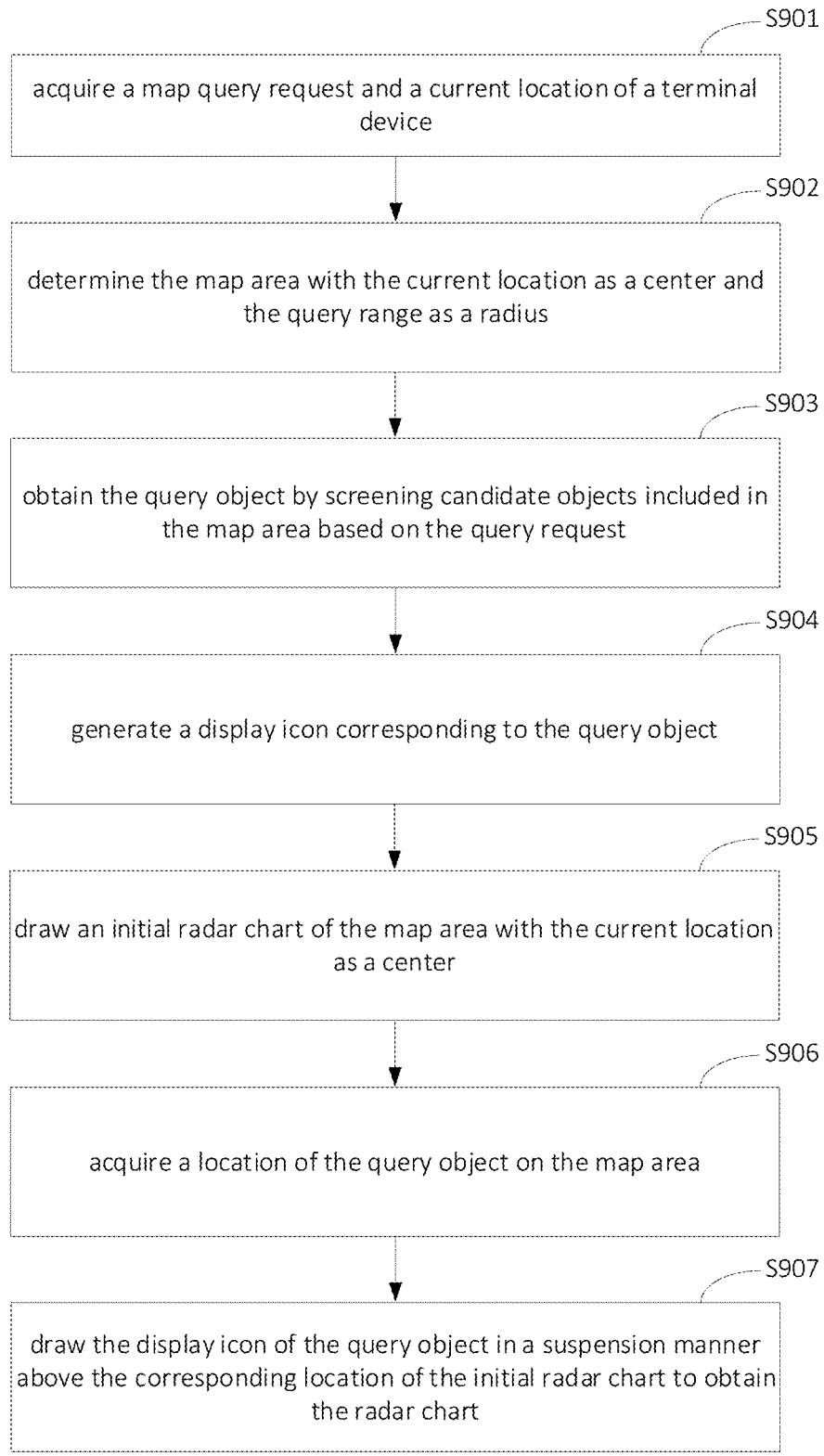
FIG. 9 is a schematic diagram according to an embodiment of the disclosure.

Taking a case that the query range is carried in the map query request as an example, as a possible implementation, as illustrated in FIG. 9, the method for map query based on the above embodiment may include the following.

At S901, the map query request and the current location of the terminal device are acquired.

The block S901 is the same with the block S101 in the above embodiment, which will not be repeated here.

The block S102 in the above embodiment may include the following blocks S902 and S903.

At S902, the map area is determined by taking the current location as a center and the query range as a radius.

Figure 10:
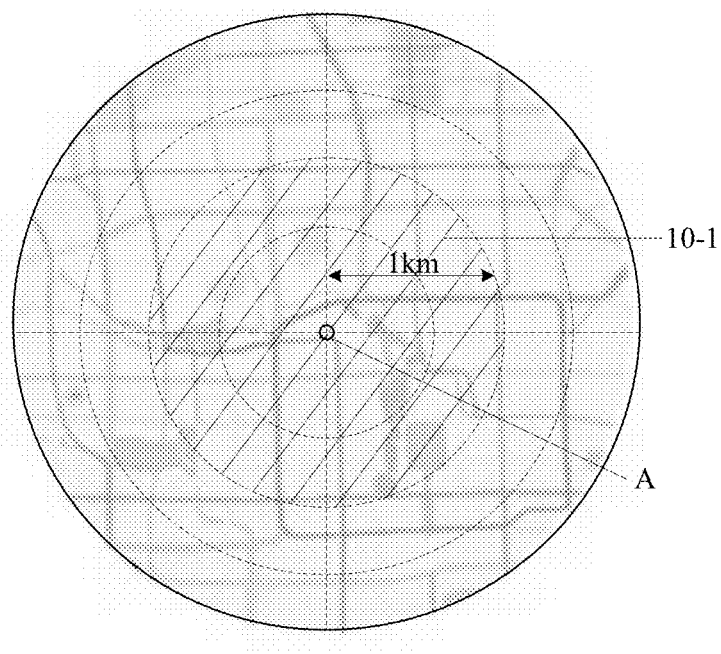
FIG. 10 is a schematic diagram illustrating a map area.

For example, as illustrated in FIG. 10, the current location acquired is A and the query range acquired is 1 km. In this case, a circular map area 10-1 with A as the center and 1 km as the radius is determined.

At S903, the query object is obtained by screening candidate objects within the map area based on the query request.

It is to be noted that, in the disclosure, the map query request may include the query range input by the user. The query range may be a query object type or a query object name, etc.

For example, the candidate objects within the map area are subway stations and bus stations, and the query range is the subway station. In this case, each subway station obtained by screening subway stations and bus stations included in the map area may be the query object.

At S904, the display icon corresponding to the query object is generated.

Figure 11:
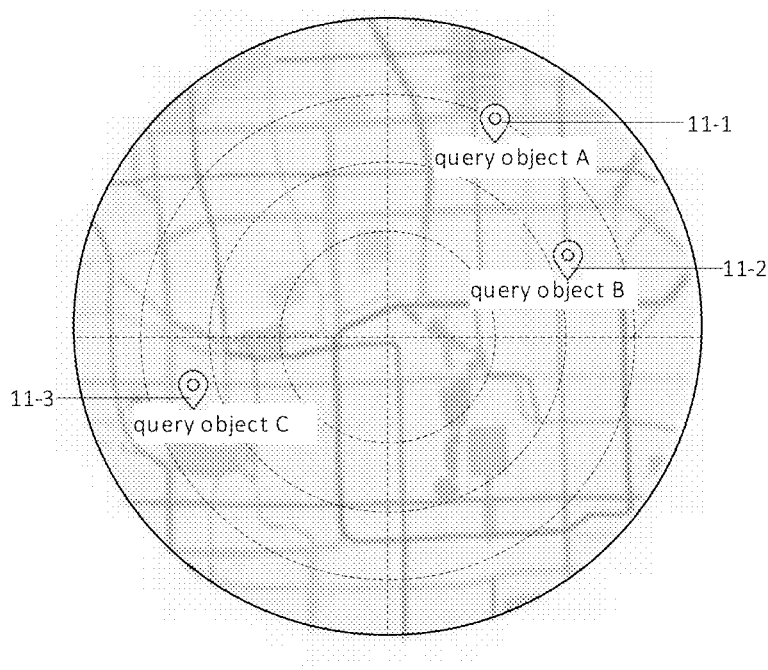
FIG. 11 is a schematic diagram illustrating a display icon.

When there are two or more query objects to be highlighted in the map area, two or more display icons are generated for the query objects. In an example, the display icons of the query objects are the same. As illustrated in FIG. 11, for the query objects A to C, display icons are 11-1 to 11-3 respectively, and the display icons 11-1 to 11-3 are the same.

Figure 12:
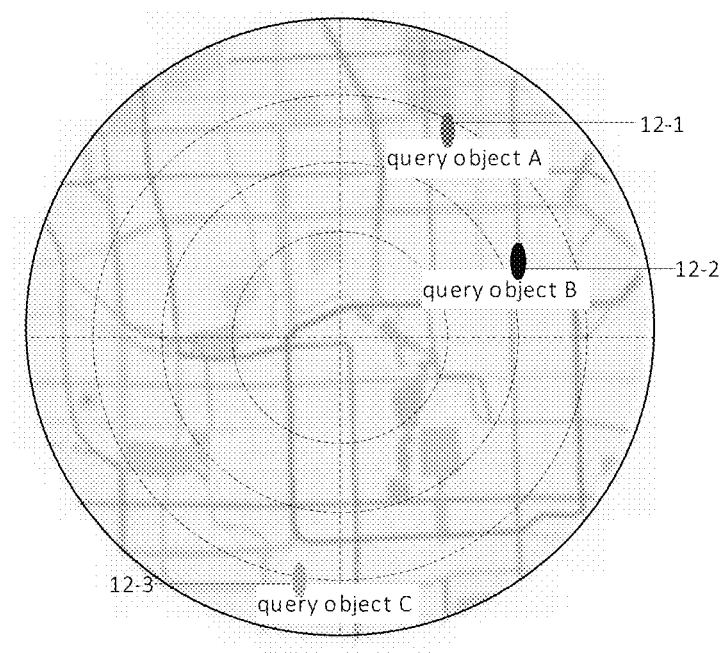
FIG. 12 is a schematic diagram illustrating another display icon.

In another example, the display icons of the query objects may be different from each other. As illustrated in FIG. 12, for the query objects A to C, display icons are respectively 12-1 to 12-3, and the display icons 12-1 to 12-3 have different colors.

A color depth of a display icon may be determined based on a distance between the query object and the current location of the terminal device. In an example, the distance between the query object B and the current location of the terminal device is the smallest. Therefore, the color depth of the display icon 12-2 is deepest. The distance between the query object A and the current location of the terminal device is greater than that of the query object B. Therefore, the color depth of the display icon 12-1 is lighter than that of the display icon 12-2. The distance between the query object C and the current location of the terminal device is the largest. Therefore, the color depth of the display icon 12-3 is the lightest.

At S905, an initial radar chart of the map area is drawn by taking the current location as a center.

At S906, a location of the query object on the map area is acquired.

At S907, the display icon of the query object is drawn above corresponding locations of the initial radar chart in a suspension manner to obtain the radar chart.

The blocks S905 to S907 are the same with blocks S404 to S406 in the above embodiment, which are not repeated here.

With the method for map query according to embodiments of the disclosure, by determining the map area with the current location as the center and the query range as the radius, and by screening the candidate objects included in the map area to obtain the query object based on the query request, the query object obtained through the screening may satisfy a detailed map query requirement of the user, which further improves the user experience.

It is to be noted that, in the disclosure, in order to further satisfy the requirement of the user on rapidly searching for different types of query objects, in obtaining the query object by screening the candidate objects included in the map area based on the query request, the query object may be obtained through the screening based on the query object type input by the user.

It is to be noted that, in the disclosure, the query object type may be carried in the map query request, or it is possible the query object type is not carried in the map query request, and the user may input the query object type in many ways.

Figure 13:
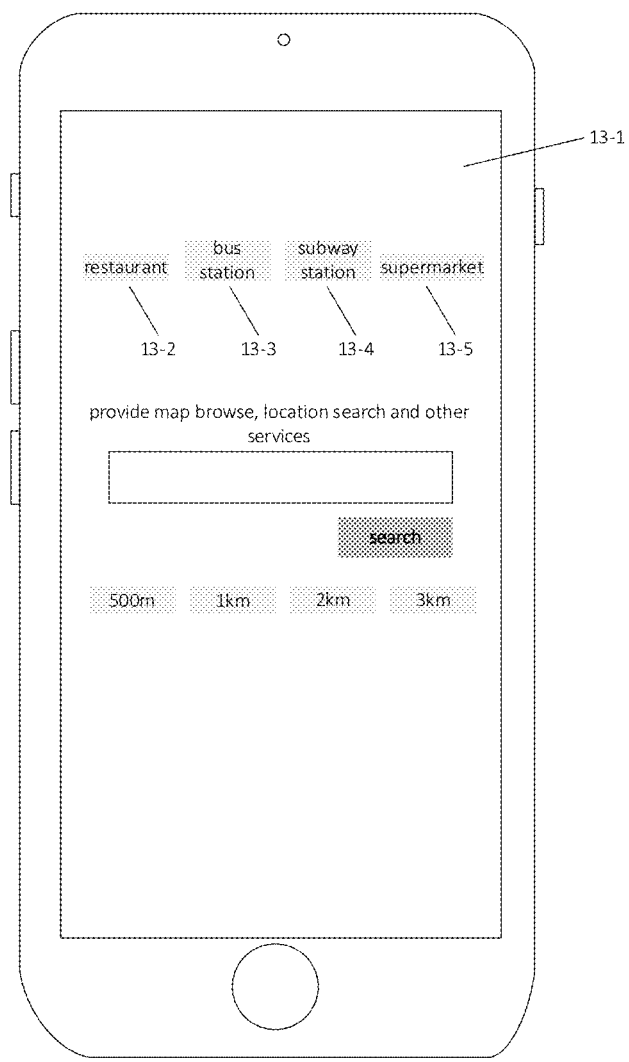
FIG. 13 is a schematic diagram illustrating another query interface.

As a possible implementation, as illustrated in FIG. 13, the query object type may be input in response to a clicking operation from the user on query object type selecting controls 13-2 to 13-5 displayed on the query interface 13-1. In this case, the query object type is carried in the map query request.

Figure 14:
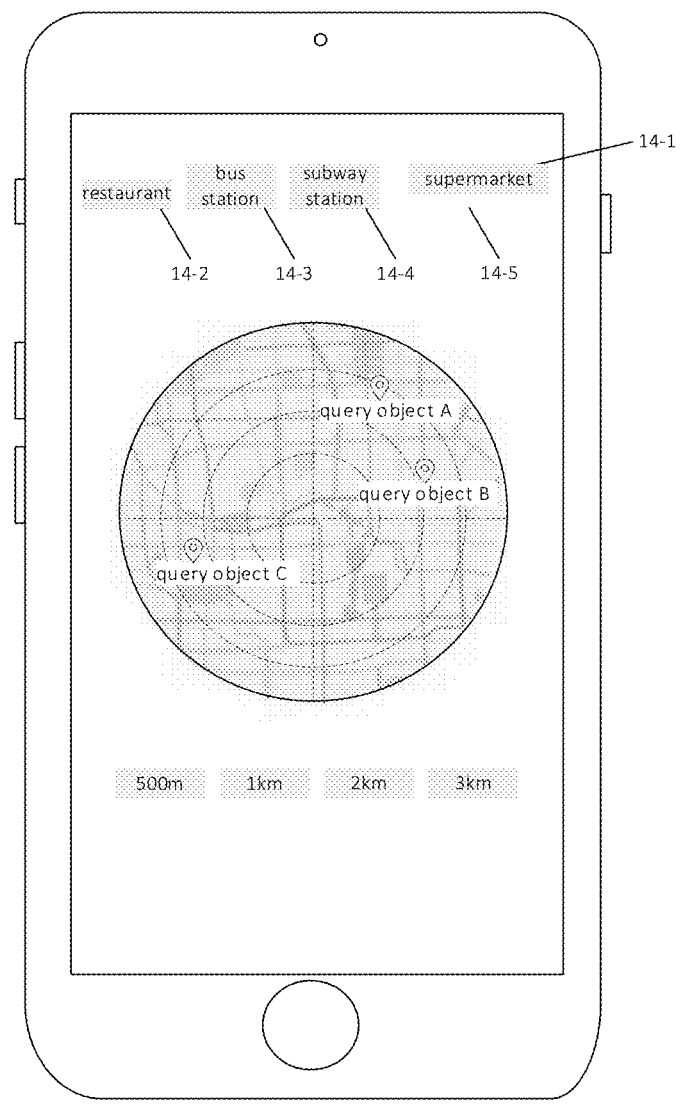
FIG. 14 is a schematic diagram illustrating a search display interface.

As another possible implementation, as illustrated in FIG. 14, the query object type may be input in response to a clicking operation from the user on query object type selecting controls 14-2 to 14-5 displayed on the search display interface 14-1. In this case, the query object type is not carried in the map query request.

Figure 15:
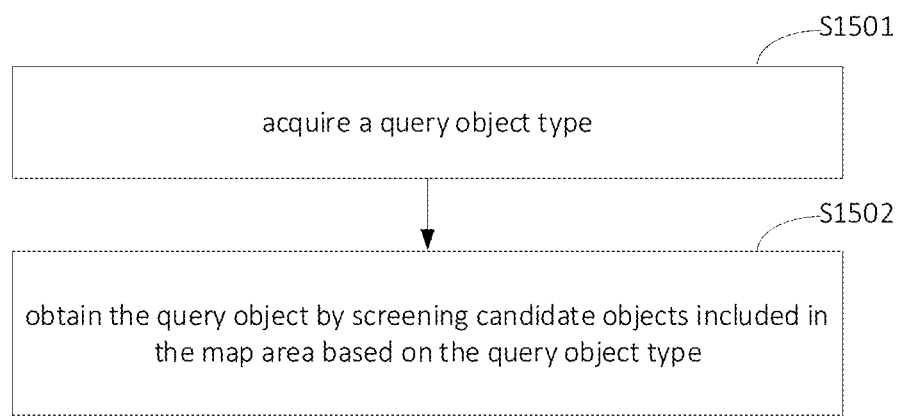
FIG. 15 is a schematic diagram according to an embodiment of the disclosure.

Taking the case that the query object type is carried in the map query request as an example, as a possible implementation, as illustrated in FIG. 15, on the basis of the above embodiment, obtaining the query object by screening the candidate objects included in the map area based on the query request at the block S903 includes the following.

At S1501, the query object type is acquired.

The query object type may be a preset type corresponding to an object that is able to be presented on the initial radar chart. For example, the query object type may be restaurant, subway station, bus station, or supermarket, etc.

It is to be noted that, in the disclosure, the number of query object types carried in one map query request is not limited. As an example, the user may perform the map query for one query object type. As another example, the user may perform the map query for three query object types at the same time.

At S1502, the query object is obtained by screening the candidate objects included in the map area based on the query request type.

It is possible that two or more query objects are obtained by screening the candidate objects within the map area based on the query request type. Further, it is possible that there are query objects obtained based on two or more query request types. In order to distinguish different types of query objects on the radar chart, the display icons may be displayed in different display styles based on the query object types.

Figure 16:
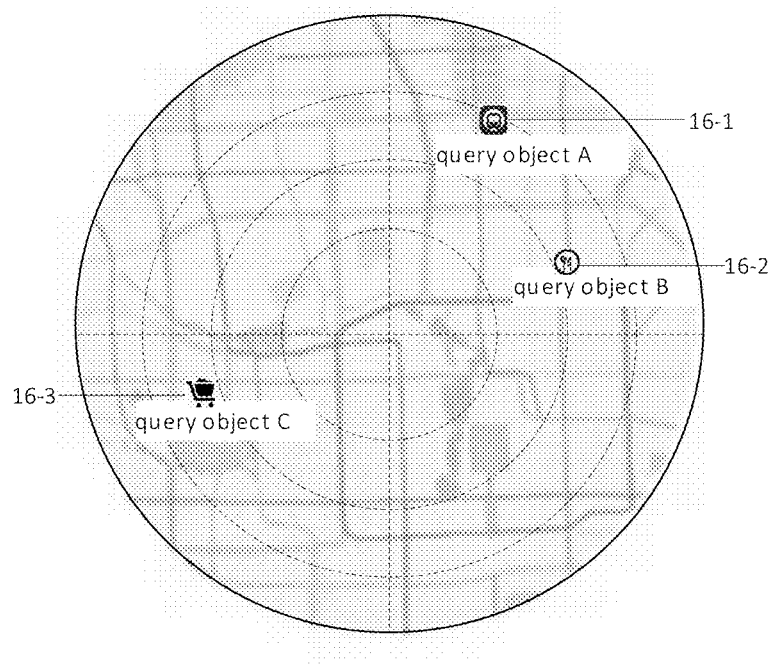
FIG. 16 is a schematic diagram illustrating another display icon.

For example, as illustrated in FIG. 16, for the query objects A to C, the display icons are respectively 16-1 to 16-3, and the display icons 16-1 to 16-3 have different styles. For example, the query object is the subway station A and the display style of the display icon 16-1 is a subway station identifier; the query object B is the restaurant and the display style of the display icon 16-2 is a restaurant identifier; the query object C is supermarket and the display style of the display icon 16-3 is a supermarket identifier.

With the method for map query according to embodiments of the disclosure, by setting different display styles of display icons for different types of query objects, different types of query objects displayed on the radar chart may be distinguished by displaying different display styles of display icons, which further improves the user experience.

It is to be noted that, in the disclosure, the server may send detailed information of a target query object to the terminal device in response to a request for displaying detailed information of the target query object, such that the terminal device displays the detailed information.

Figure 17:
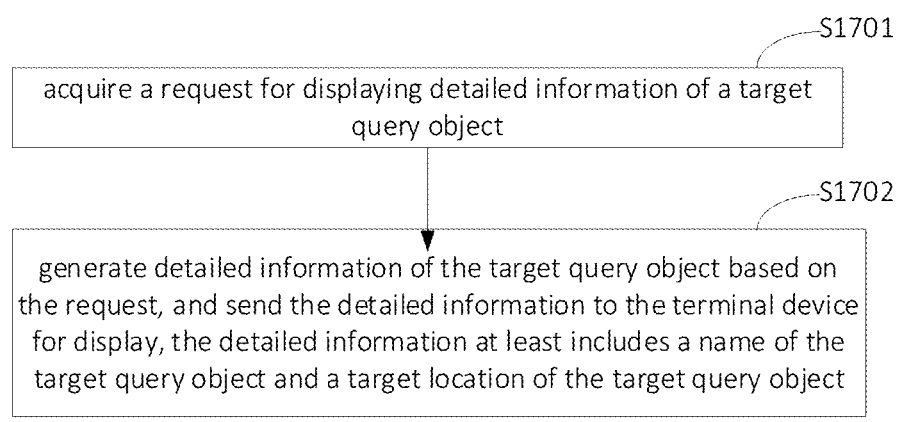
FIG. 17 is a schematic diagram according to an embodiment of the disclosure.

As a possible implementation, as illustrated in FIG. 17, the method for map query according to the disclosure, on the basis of the above embodiment, includes the following.

At S1701, a request for displaying detailed information of a target query object is acquired.

It is to be noted that, in the disclosure, the request for displaying detailed information of a target query object may be sent in many ways.

In an example, the request for displaying detailed information of a target query object may be sent in response to a clicking operation on a display icon on the search display interface of the terminal device such as a mobile phone.

Correspondingly, the server may receive the request for displaying detailed information of a target query object sent by the terminal device and designated by the user.

At S1702, detailed information of the target query object is generated based on the request, and detailed information is sent to the terminal device. The detailed information at least includes a name of the target query object and a target location of the target query object.

Figure 18:
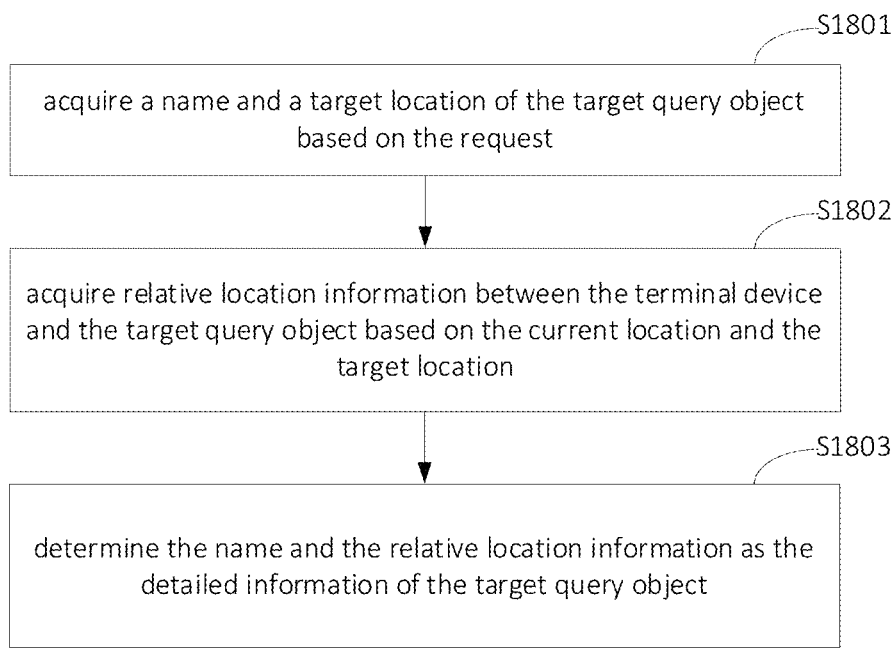
FIG. 18 is a schematic diagram according to an embodiment of the disclosure.

As a possible implementation, as illustrated in FIG. 18, on the basis of the above embodiment, generating the detailed information of the target query object and sending the detailed information to the terminal device at the block S1702 includes the following.

At S1801, a name and a target location of the target query object are acquired based on the request.

For example, after the request for displaying detailed information of a subway station A is acquired, the name of the subway station A and the target location A may be acquired.

At S1802, relative location information between the terminal device and the target query object is acquired based on the current location and the target location.

The current location and the target location are both absolute geographic coordinates. The absolute geographic coordinates refer to the geographic coordinates in the real world, which can be obtained by a GPS. In this case, relative location information between the terminal device and the target query object may be acquired.

At S1803, the name and the relative location information are determined as the detailed information of the target query object.

With the method for map query according to embodiments of the disclosure, the name and the target location of the target query object may be acquired based on the request, and the relative location information between the terminal device and the target query object may be acquired based on the current location and the target location. The name and the relative location information may be determined as detailed information of the target query object. Therefore, the user may acquire the detailed information of any target query object from the query result, which further improves the user experience.

It is to be noted that, in actual applications, since the current location of the terminal device and the query requirement from the user are dynamic, the radar chart may be updated in response to detecting an update event of the radar chart in the disclosure.

In an example, an updated radar chart may be generated and sent to the terminal device in response to the update event of the radar chart such that the terminal device displays the updated radar chart.

The update event of the radar chart includes obtaining a request for modifying a query condition or a display time of the radar chart reaching a preset time threshold. The preset time threshold may be set based on actual situations, such as 2 seconds (s), 5 s, etc.

With the method for map query according to embodiments of the disclosure, by generating and sending the updated radar chart to the terminal device in response to the update event of the radar chart, the displayed radar chart may satisfy actual requirements, which improves the efficiency and reliability in the map query process.

Figure 19:
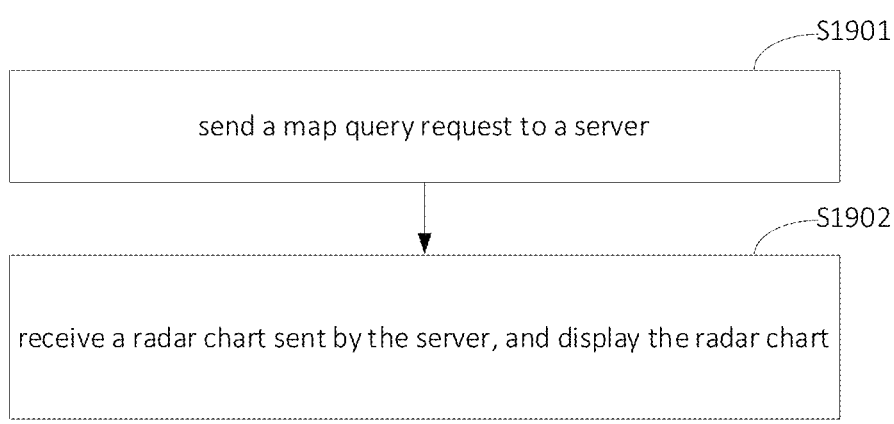
FIG. 19 is a schematic diagram according to an embodiment of the disclosure.

FIG. 19 is a diagram according to an embodiment of the disclosure. It is to be noted that, the executive subject of the method for map query in this embodiment is the terminal device. As illustrated in FIG. 19, the method for map query according to embodiments includes the following.

At S1901, a map query request is sent to a server.

It is be noted that, in the disclosure, the map query request may be sent in many ways.

In an example, the map query request may be sent in response to a clicking operation from the user on a query interface of the terminal device such as a mobile phone. In another example, the map query request may be sent in response to voice information input by the user.

Correspondingly, the server may receive the map query request sent by the terminal device.

At S1902, a radar chart sent by the server is received, and the radar chart is displayed.

In an example, the terminal device may receive the drawn radar chart sent by the server, and call a search display page to load the radar chart on the search display page.

With the method for map query according to embodiments of the disclosure, the map query request may be sent to the server and the radar chart sent by the server may be received and displayed. Therefore, in the disclosure, by displaying the radar chart with the current location as a center, the user may perform the map query conveniently, and at the same time acquire useful location information intuitively, which enhances the efficiency in the map query process and improves the user experience.

It is to be noted that, in the disclosure, the terminal device may send a request for displaying detailed information of a target query object to the server, to acquire and display the detailed information of the target query object.

Figure 20:
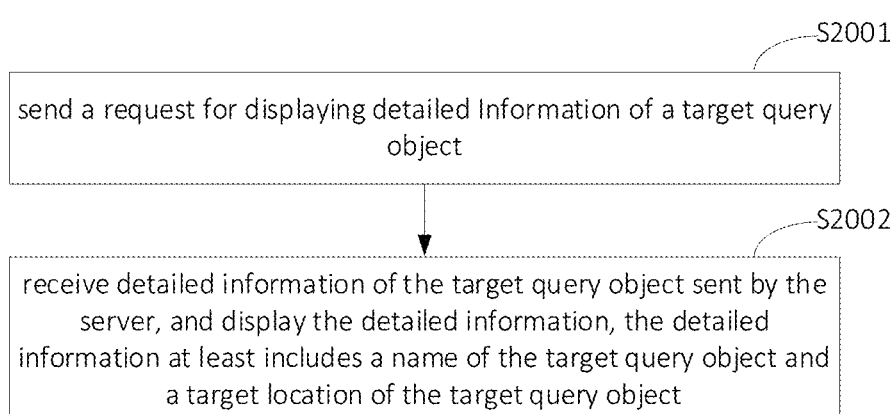
FIG. 20 is a schematic diagram according to an embodiment of the disclosure.

As a possible implementation, as illustrated in FIG. 20, the method for map query according to the disclosure, based on the above embodiment, includes the following.

At S2001, a request for displaying detailed information of a target query object is sent.

It is to be noted that, in the disclosure, the request for displaying detailed information of a target query object may be sent in many ways.

In an example, the request for displaying detailed information of the target query object is sent in response to a clicking operation from the user on a display icon displayed on the search display interface of the terminal device such as a mobile phone.

Correspondingly, the terminal device may send the request for displaying detailed information of the target query object to the server in response to monitoring a corresponding operation from the user.

At S2002, detailed information of the target query object sent by the server is received and displayed. The detailed information at least includes a name of the target query object and a target location of the target query object.

It is to be noted that, in order to further improve the user experience, a display style can be preset for displaying the target location of the target query object. In an example, the target location may be not displayed in a format of {latitude, longitude}, but in a format of {number, road, district, city}.

Figure 21:
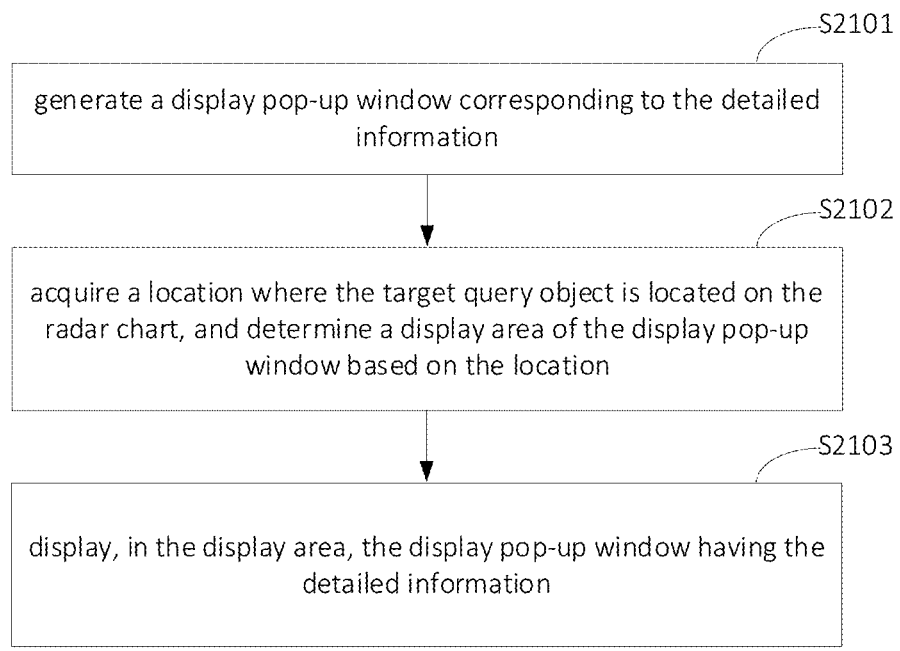
FIG. 21 is a schematic diagram according to an embodiment of the disclosure.

As a possible implementation, as illustrated in FIG. 21, based on the above embodiment, displaying the detailed information at the block S2002 includes the following.

At S2101, a display pop-up window corresponding to the detailed information is generated.

Configurations, such as the style and the size, of the display pop-up window are not limited in the disclosure, which may be set based on actual situations.

At S2102, a location where the target query object is located on the radar chart is acquired, and a display area of the display pop-up window is determined based on the location.

At S2103, the display pop-up window having the detailed information is displayed in the display area.

Figure 22:
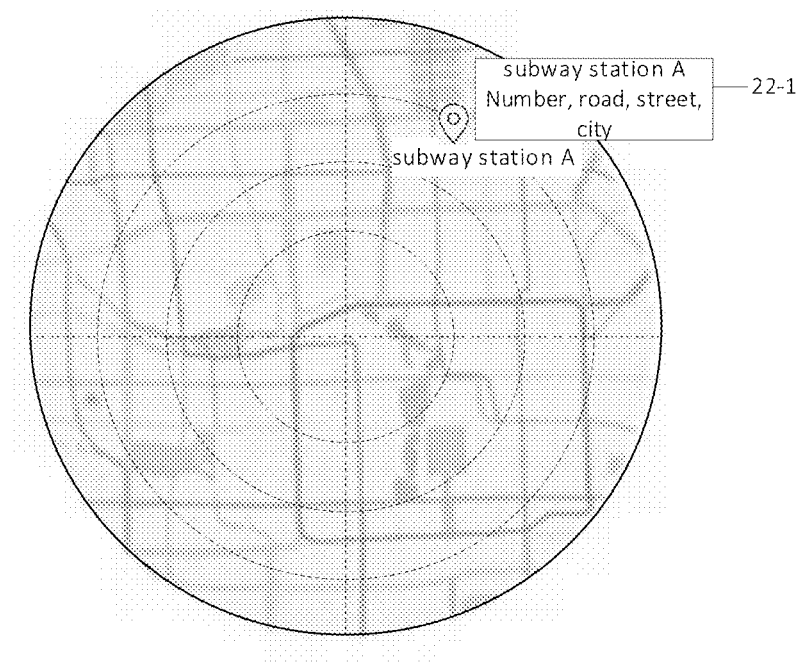
FIG. 22 is a schematic diagram illustrating a display pop-up window.

For example, as illustrated in FIG. 22, the target query object is the subway station A. In this case, the display pop-up window 22-1 having the detailed information is displayed within the display area.

It is to be noted that, in actual applications, since the specific query requirement from the user is dynamic, a request for modifying a query condition can be sent to the server to instruct the server to update the radar chart in the disclosure.

Figure 23:
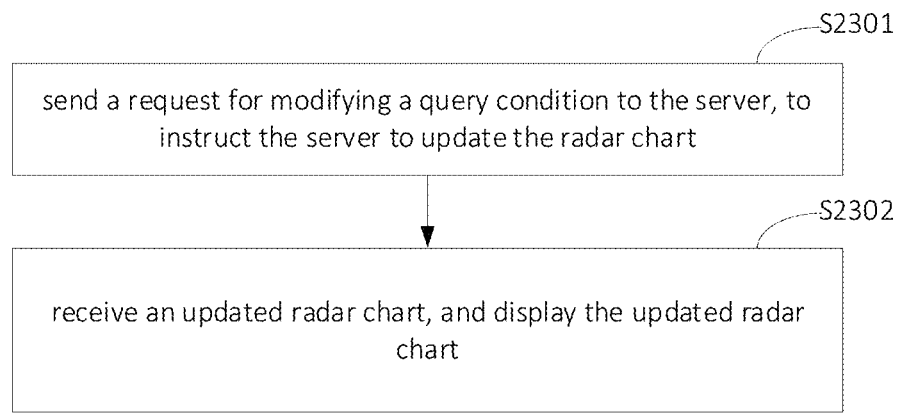
FIG. 23 is a schematic diagram according to an embodiment of the disclosure.

As a possible implementation, as illustrated in FIG. 23, based on the above embodiment, the method includes the following.

At S2301, a request for modifying a query condition is sent to the server, to instruct the server to update the radar chart.

For example, the terminal device may send the request for modifying the query condition, such as a request for modifying the query range, to the server, such that the server updates the radar chart based on the modified query range.

At S2302, an updated radar chart is received and displayed.

With the method for map query according to embodiments of the disclosure, by sending the request for modifying a query condition to the server to instruct the server to update the radar chart, and by receiving and displaying the updated radar chart, the displayed radar chart may satisfy actual requirements, which improves the efficiency and reliability in the map query process.

Taking a query process of relevant functions of remote dictionary server (Redis) geography (GEO) as an example, the whole process of the method for map query according to the disclosure is illustrated.

The map query request may be sent by the terminal device. In this case, the terminal device may acquire and send the current location to the server once obtaining authorization from the user. The current location including latitude and longitude information may be taken as parameters to request a cloud data interface from the server.

Further, after the server receives the current location, the server may acquire the query type and the query range and call a get Point-of-Interest list (getPoiList) method to obtain the query object. For example, by transmitting the getPoiList (City: SUBWAY, "longitude information", "latitude information", "2 km"), the gepradius and geopos methods provided by the Redis can be called, and the information with a specific data format is obtained through splicing based on the parameter conversion and calling and sent to the terminal device.

The georadius refers to a method for finding an element within a certain radius with a location at a given longitude and a given latitude as a center. The geopos refers to a method for acquiring coordinates of a geographic location.

The terminal device may display radar chart and mark the query object(s).

Details of a target query object can be obtained by clicking a display icon on the radar chart by the user. The details at least include the name of the target query object and the target location of the target query object.

It is be noted that, the information such as the names and the locations of the query objects is entered in advance, but effective location information of the terminal device cannot be entered in advance. In this case, the target location may be acquired by means of the geodist method of the Redis GEO based on the longitude and latitude information of the current location. For example, a temporary location of the terminal device may be created based on an identity document (ID) of the user and time. Further, the created temporary location may be deleted after the target location is obtained. The details is sent to the terminal device, such that the user may acquire the detailed information of the target query object through the terminal device.

Further, since the location of the terminal device is constantly changing, the radar chart may be constantly refreshed to ensure the accuracy. In an example, a timer may be equipped on the terminal device to request server data periodically every 2, 3, 4 or 5 seconds to render the map, such that the updated radar chart is generated.

With the method for map query according to embodiments of the disclosure, a method for acquiring information of the query object rapidly, accurately, and intuitively may be provided to the user, and the modification of the query condition may be achieved based on easy operations, thereby enhancing the efficiency in the map query process and improving the user experience.

It is be noted that, acquisition, storage and application of user personal information involved in the disclosure comply with relevant laws and regulations, and do not violate public order and good customs. The intention of the disclosure is to manage and process personal information data in a way of minimizing the risk of unintentional or unauthorized use access. The risk is minimized by restricting data collection and deleting data when it is no longer needed. It is to be noted that all information related to the personnel in the disclosure is collected with the knowledge and consent of the personnel.

Corresponding to the method for map query according to the disclosure, an apparatus for map query is also provided. Since the apparatus for map query according to embodiments of the disclosure corresponds to the method for map query according to embodiments of the disclosure, the implementation of the method for map query is also applied to the apparatus for map query, which will not be described below.

Figure 24:
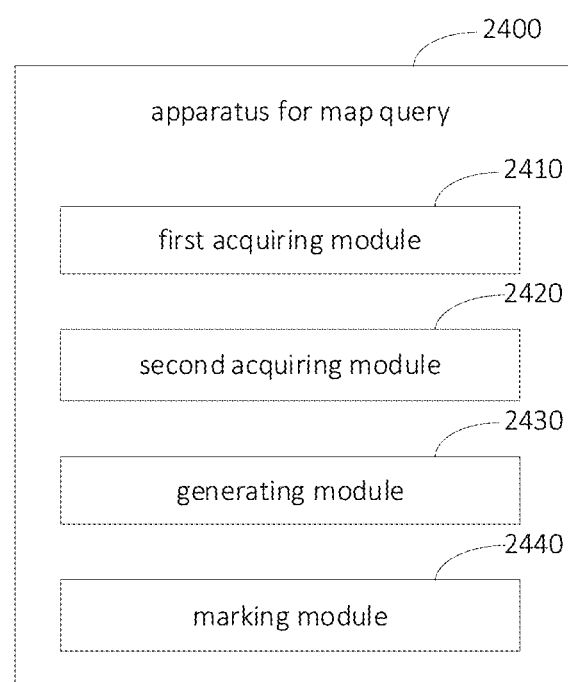
FIG. 24 is a block diagram illustrating an apparatus for map query configured to perform a method for map query according to the embodiment of the disclosure.

FIG. 24 is a block diagram illustrating an apparatus for map query according to an embodiment of the disclosure.

As illustrated in FIG. 24, the apparatus 2400 for map query includes a first acquiring module 2410, a second acquiring module 2420, a generating module 2430, and a marking module 2440.

The first acquiring module 2410 is configured to acquire a map query request and a current location of a terminal device.

The second acquiring module 2420 is configured to acquire a map area to be displayed, and one or more query objects to be highlighted in the map area based on the map query request and the current location.

The generating module 2430 is configured to generate one or more display icons respectively corresponding to the one or more query objects.

The marking module 2440 is configured to draw a radar chart of the map area based on the current location, and mark a location where each query object is located with a corresponding display icon.

Figure 25:
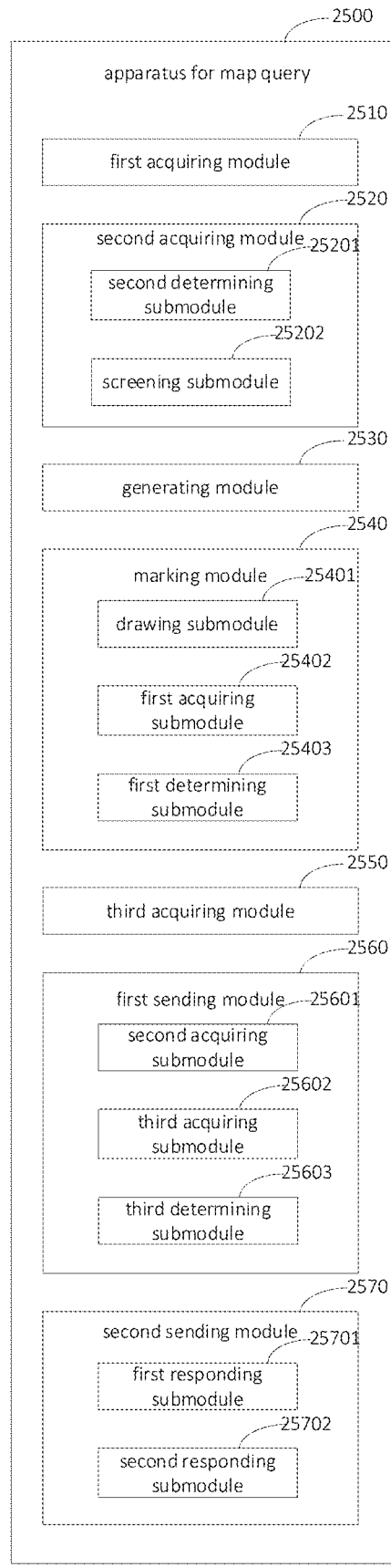
FIG. 25 is a block diagram illustrating an apparatus for map query configured to perform a method for map query according to the embodiment of the disclosure.

FIG. 25 is a schematic diagram illustrating an apparatus for map query according to another embodiment of the disclosure.

As illustrated in FIG. 25, the apparatus 2500 for map query includes a first acquiring module 2510, a second acquiring module 2520, a generating module 2530 and a marking module 2540.

The marking module 2540 includes a drawing submodule 25401, a first acquiring submodule 25402 and a first determining submodule 25403.

The drawing submodule 25401 is configured to draw an initial radar chart of the map area with the current location as a center.

The first acquiring submodule 25402 is configured to acquire a location of each query object on the map area.

The first determining submodule 25403 is configured to draw the one or more display icons of the one or more query objects in a suspension manner above corresponding locations of the initial radar chart to obtain the radar chart.

The map query request includes a query range.

The second acquiring module 2520 includes a second determining submodule 25201 and a screening submodule 25202.

The second determining submodule 25201 is configured to determine the map area with the current location as a center and the query range as a radius.

The screening submodule 25202 is configured to obtain the one or more query objects by screening the candidate objects included in the map area based on the query request.

The apparatus 2500 for map query further includes a third acquiring module 2550, a first sending module 2560 and a second sending module 2570.

The third acquiring module 2550 is configured to acquire a request for displaying detailed information of a target query object.

The first sending module 2560 is configured to generate detailed information of the target query object based on the request, and send the detailed information to the terminal device. The detailed information at least includes a name of the target query object and a target location of the target query object.

The second sending module 2570 is configured to generate an updated radar chart in response to detecting an update event of the radar chart, and send the updated radar chart to the terminal device for display.

The first sending module 2560 includes a second acquiring submodule 25601, a third acquiring submodule 25602 and a third determining submodule 25603.

The second acquiring submodule 25601 is configured to acquire the name and the target location of the target query object based on the request for displaying detailed information.

The third acquiring submodule 25602 is configured to acquire relative location information between the terminal device and the target query object based on the current location and the target location.

The third determining submodule 25603 is configured to determine the name and the relative location information as the detailed information of the target query object.

The second sending module 2570 includes a first responding submodule 25701 or a second responding submodule 25702.

The first response submodule 25701 is configured responding to acquiring a request for modifying a query condition.

The second response submodule 25702 is configured responding to the display time of the radar chart reaching a preset time threshold.

It is to be noted that, the first acquiring module 2410, the second acquiring module 2420, and the generating module 2430 have the same functions and structures with the first acquiring module 2510, the second acquiring module 2520 and the generating module 2530.

With the apparatus for map query according to embodiments of the disclosure, by acquiring the map query request and the current location of the terminal device, by acquiring the map area to be displayed and the one or more query objects based on the map query request and the current location, and by generating the one or more display icons corresponding to the one or more query objects, the radar chart of the map area may be drawn based on the current location, and the one or more display icons may be displayed at the locations where the one or more query objects are located. Therefore, in the disclosure, by displaying the radar chart with the current location as the center, the user may perform the map query conveniently, and at the same time, acquire useful location information intuitively, which enhances the efficiency in the map query process and improves the user experience.

Figure 26:
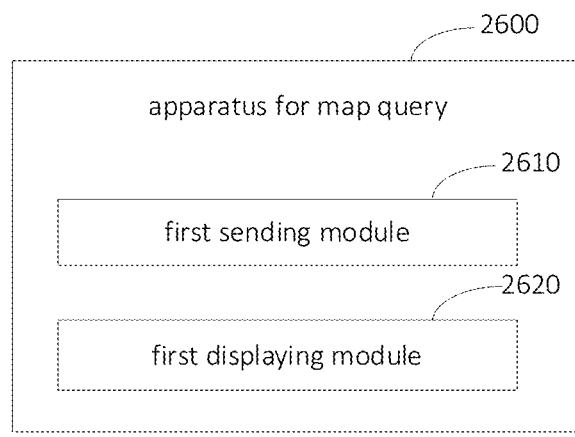
FIG. 26 is a block diagram illustrating an apparatus for map query configured to perform a method for map query according to the embodiment of the disclosure.

FIG. 26 is a block diagram illustrating an apparatus for map query according to an embodiment of the disclosure.

As illustrated in FIG. 26, the apparatus 2600 for map query includes a first sending module 2610 and a first displaying module 2620.

The first sending module 2610 is configured to send a map query request to a server.

The first displaying module 2620 is configured to receive a radar chart sent by the server, and display the radar chart.

Figure 27:
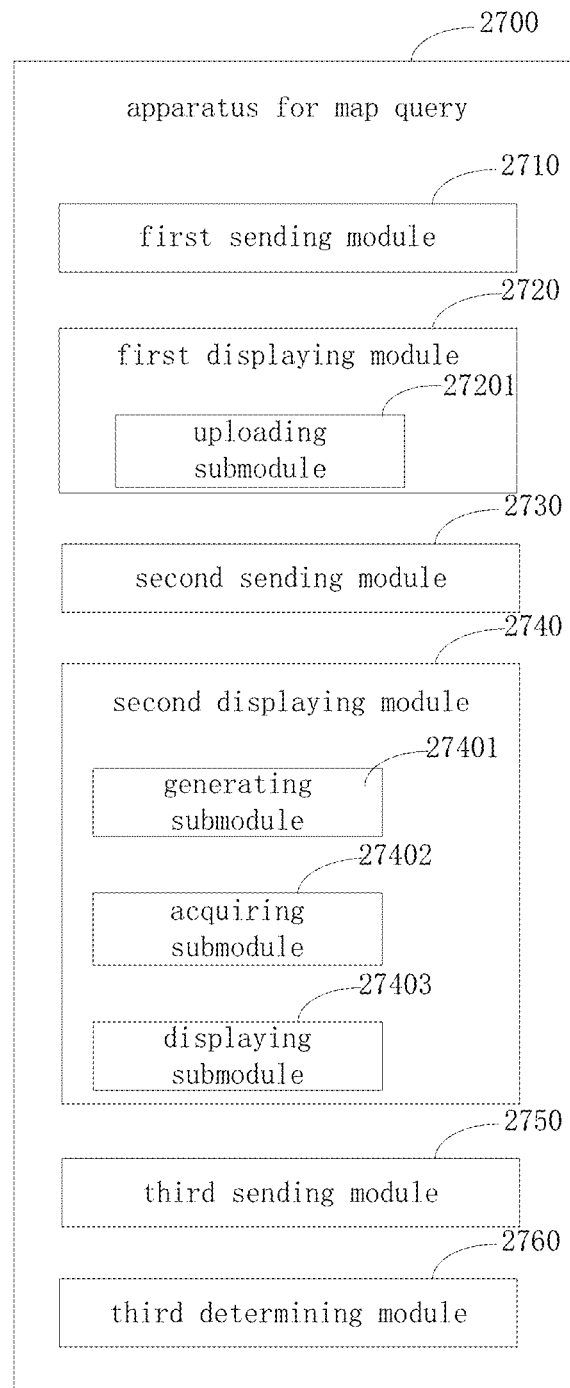
FIG. 27 is a block diagram illustrating an apparatus for map query configured to perform a method for map query according to the embodiment of the disclosure.

FIG. 27 is a block diagram illustrating an apparatus for map query according to an embodiment of the disclosure.

As illustrated in FIG. 27, the apparatus 2700 for map query includes a first sending module 2710 and a first displaying module 2720.

The first sending module 2720 includes a loading submodule 27201.

The loading submodule 27201 is configured to call a search display page, and load the radar chart on the search display page.

The apparatus 2700 for map query further includes a second sending module 2730, a second displaying module 2740, a third sending module 2750, and a third displaying module 2760.

The second sending module 2730 is configured to send a request for displaying detailed information of a target query object.

The second displaying module 2740 is configured to receive detailed information of the target query object sent by the server, and display the detailed information. The detailed information at least includes a name of the target query object and a target location of the target query object.

The third sending module 2750 is configured to send a request for modifying a query condition to the server, to instruct the server to update the radar chart.

The third displaying module 2760 is configured to receive an updated radar chart, and display the updated radar chart.

The second displaying module 2740 includes a generating submodule 27401, an acquiring submodule 27402 and a displaying submodule 27403.

The generating submodule 27401 is configured to generate a display pop-up window corresponding to the detailed information.

The acquiring submodule 27402 is configured to acquire a location where the target query object is located on the radar chart, and determine a display area of the display pop-up window based on the location.

The display submodule 27403 is configured to display, in the display area, the display pop-up window having the detailed information.

It is be noted that, the first sending module 2610 has the same function and structure with the first sending module 2701.

With the apparatus for map query according to embodiments of the disclosure, by sending the map query request to the server, and by receiving the radar chart sent by the server, the radar chart can be displayed. Therefore, in the disclosure, by displaying the radar chart with the current location as the center, the user may perform the map query conveniently, and at the same time, acquire useful location information intuitively, which enhances the efficiency in the map query process and improves the user experience.

According to embodiments of the disclosure, there is provided an electronic device, a readable storage medium and a computer program product.

Figure 28:
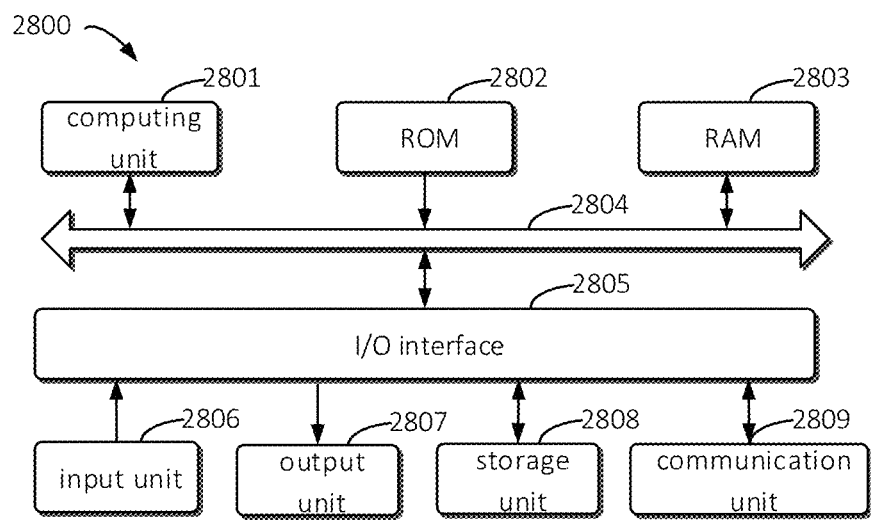
FIG. 28 is a block diagram illustrating an electronic device configured to achieve map query according to the embodiment of the disclosure.

FIG. 28 illustrates a schematic block diagram of an example electronic device 2800 configured to execute the embodiment of the disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 28, the device 2800 includes a computing unit 2801, which may execute various appropriate actions and processing based on a computer program stored in a read-only memory (ROM) 2802 or a computer program loaded into a random-access memory (RAM) 2803 from a storage unit 2808. In the RAM 2803, various programs and data required for operation of the device 2800 may also be stored. The computing unit 2801, the ROM 1802, and the RAM 2803 are connected to each other through a bus 2804. An input/output (I/O) interface 2805 is also connected to a bus 2804.

Several components in the device 2800 are connected to the I/O interface 2805, and include: an input unit 2806, for example, a keyboard, a mouse, etc.; an output unit 2807, for example, various types of displays, speakers, etc.; a storage unit 2808, for example, a magnetic disk, an optical disk, etc.; and a communication unit 2809, for example, a network card, a modem, a wireless communication transceiver, etc. The communication unit 2809 allows the device 2800 to exchange information/data with other devices over a computer network such as the Internet and/or various telecommunication networks.

The computing unit 2801 may be various general-purpose and/or special-purpose processing components with processing and computing capacities. Some examples of the computing unit 2801 include but not limited to a central processing unit (CPU), a graphs processing unit (GPU), various dedicated artificial intelligence (AI) computing chips, various computing units running a machine learning model algorithm, a digital signal processor (DSP), and any appropriate processor, controller, microcontroller, etc. The computing unit 2801 performs various methods and processing as described above, for example, a method for map query as described in a first aspect of embodiments of the disclosure or a method for map query as described in a second aspect of embodiments of the disclosure. For example, in some embodiments, the method for map query may be further achieved as a computer software program, which is physically contained in a machine readable medium, such as a storage unit 2808. In some embodiments, a part or all of computer programs may be loaded and/or mounted on the device 2800 via a ROM 2802 and/or a communication unit 2809. When the computer program is loaded on a RAM 2803 and executed by a computing unit 2801, one or more blocks in the method for map query as described above may be performed. Alternatively, in other embodiments, a computing unit 2801 may be configured to perform a method for map query as described in a first aspect of embodiments of the disclosure or a method for map query as described in a second aspect of embodiments of the disclosure in other appropriate ways (for example, by virtue of a firmware).

Various implementation modes of the systems and technologies described above may be achieved in a digital electronic circuit system, a field programmable gate array (FPGA), an application-specific integrated circuit (ASIC), an application specific standard product (ASSP), a system-on-chip (SOC) system, a complex programmable logic device, a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of a plurality of programming languages. The programming languages may be provided to a processor or a controller of a general purpose computer, a dedicated computer, or other apparatuses for repairing a programmable character image so that the function/operation specified in the flowchart and/or block diagram may be performed when the program code is executed by the processor or controller. A computer code may be performed completely or partly on the machine, performed partly on the machine as an independent software package and performed partly or completely on the remote machine or server.

In the context of the disclosure, a machine-readable medium may be a tangible medium that may contain or store a program intended for use in or in conjunction with an instruction execution system, apparatus, or device. A machine readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an erasable programmable read-only memory (an EPROM or a flash memory), an optical fiber device, and a portable optical disk read-only memory (CDROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphic user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relationship between the client and the server is generated by computer programs running on the corresponding computer and having a client-server relationship with each other. A server may be a cloud server, also known as a cloud computing server or a cloud host, is a host product in a cloud computing service system, to solve the shortcomings of large management difficulty and weak business expansibility existed in the traditional physical host and Virtual Private Server (VPS) service. A server further may be a server with a distributed system, or a server in combination with a blockchain.

The disclosure further provides a computer program product including a computer program, the computer program achieves the method for map query as described in the first aspect of embodiments of the disclosure or the method for map query as described in the second aspect of embodiments of the disclosure when performed by a processor.

It is to be understood that, various forms of procedures shown above may be configured to reorder, add, or delete blocks. For example, blocks described in the disclosure may be executed in parallel, sequentially, or in different orders, as long as the desired result of the technical solution disclosed in the present disclosure may be achieved, which will not be limited herein.

The above specific implementations do not constitute a limitation on the protection scope of the disclosure. Those skilled in the art should understand that various modifications, combinations, sub-combinations, and substitutions may be made according to design requirements and other factors. Any modification, equivalent replacement, improvement, etc., made within the spirit and principle of embodiments of the present disclosure shall be included within the protection scope of the present disclosure.

What is claimed is:

1. A method for map query, comprising:
acquiring, by a server, a map query request and a current location of a terminal device;
acquiring, by the server, a map area to be displayed and a query object to be highlighted in the map area based on the map query request and the current location;
generating, by the server, a display icon corresponding to the query object;
drawing, by the server, a radar chart of the map area based on the current location, and marking, by the server, the location where the query object is located with the display icon; and
generating an updated radar chart in response to detecting a display time of the radar chart reaching a preset time threshold, and sending the updated radar chart to the terminal device.

2. The method of claim 1, wherein drawing the radar chart of the map area based on the current location, and marking the location where the target query object is located with the display icon comprises:
drawing an initial radar chart on the map area with the current location as a center;
acquiring a location of the query object on the map area; and
drawing the display icon of the query object in a suspension manner above the location of the initial radar chart, to obtain the radar chart.

3. The method of claim 2, wherein the map query request comprises a query range, and acquiring the map area to be displayed and the query object to be highlighted in the map area based on the map query request and the current location comprises:

determining the map area with the current location as a center and the query range as a radius; and obtaining the query object by screening candidate objects within the map area based on the query request.

4. The method of claim 1, further comprising:

acquiring a request for displaying detailed information of a target query object; and generating detailed information of the target query object based on the request, and sending the detailed information to the terminal device, wherein the detailed information at least comprises a name of the target query object and a target location of the target query object.

5. The method of claim 4, wherein generating the detailed information of the target query object based on the request comprises:

acquiring the name of the target query object and the target location of the target query object based on the request;

acquiring relative location information between the terminal device and the target query object based on the current location and the target location; and determining the name and the relative location information as the detailed information of the target query object.

6. A method for map query, comprising:

sending, by a terminal device, a map query request to a server;

receiving, by the terminal device, a radar chart sent by the server, and displaying the radar chart;

sending a display time of the radar chart reaching a preset time threshold, to instruct the server to update the radar chart; and receiving an updated radar chart, and displaying the updated radar chart.

7. The method of claim 6, wherein displaying the radar chart comprises:

calling a search display page, and loading the radar chart on the search display page.

8. The method of claim 6, further comprising:

sending a request for displaying detailed information of a target query object; and receiving detailed information of the target query object sent by the server, and displaying the detailed information, wherein the detailed information at least comprises a name of the target query object and a target location of the target query object.

9. The method of claim 8, displaying the detailed information comprises:

generating a display pop-up window corresponding to the detailed information;

acquiring a location where the target query object is located on the radar chart, and determining a display area for the display pop-up window based on the location; and displaying, in the display area, the display pop-up window having the detailed information.

10. An electronic device, comprising:

a processor; and a memory;

wherein when the processor runs a program corresponding to executable program codes by reading the executable program codes stored in the memory, the processor is configured to:

acquire a map query request and a current location of a terminal device;

acquire a map area to be displayed and a query object to be highlighted in the map area based on the map query request and the current location;

generate a display icon corresponding to the query object;

draw a radar chart of the map area based on the current location, and mark the location where the query object is located with the display icon; and generate an updated radar chart in response to detecting a display time of the radar chart reaching a preset time threshold, and send the updated radar chart to the terminal device.

11. The electronic device of claim 10, wherein the processor is further configured to:

draw an initial radar chart on the map area with the current location as a center;

acquire a location of the query object on the map area; and draw the display icon of the query object in a suspension manner above the location of the initial radar chart, to obtain the radar chart.

12. The electronic device of claim 11, wherein the map query request comprises a query range, and the processor is further configured to:

determine the map area with the current location as a center and the query range as a radius; and obtain the query object by screening candidate objects within the map area based on the query request.

13. The electronic device of claim 10, wherein the processor is further configured to:

acquire a request for displaying detailed information of a target query object; and generate detailed information of the target query object based on the request, and send the detailed information to the terminal device, wherein the detailed information at least comprises a name of the target query object and a target location of the target query object.

14. The electronic device of claim 13, wherein the processor is further configured to:

acquire the name of the target query object and the target location of the target query object based on the request;

acquire relative location information between the terminal device and the target query object based on the current location and the target location; and determine the name and the relative location information as the detailed information of the target query object.

15. A non-transitory computer readable storage medium, having a computer program stored thereon, wherein when the program is performed by a processor, a method for map query is performed, the method comprising:

acquiring a map query request and a current location of a terminal device;

acquiring a map area to be displayed and a query object to be highlighted in the map area based on the map query request and the current location;

generating a display icon corresponding to the query object;

drawing a radar chart of the map area based on the current location, and marking the location where the query object is located with the display icon; and generating an updated radar chart in response to detecting a display time of the radar chart reaching a preset time threshold, and sending the updated radar chart to the terminal device.

* * * * *